Jan. 14, 1930.  D. M. SOLENBERGER  1,743,578

PISTON RING

Filed Sept. 26, 1927

Inventor
Dean M. Solenberger
By Whittemore Hulbert
Whittemore & Belknap
Attorneys Patented Jan. 14, 1930

1,743,578

UNITED STATES PATENT OFFICE

DEAN M. SOLENBERGER, OF CLEVELAND, OHIO, ASSIGNOR TO THE SIMPLEX PISTON RING COMPANY OF AMERICA, INC., A CORPORATION OF OHIO

PISTON RING

Application filed September 26, 1927. Serial No. 222,091. REISSUED

The invention relates to piston rings and more particularly to rings designed for use in oil draining grooves to control the thickness of the lubricating film on the cylinder wall.

In the present state of the art rings for this purpose have been arranged in the lower ring groove of the piston which latter is provided with drain apertures for the escape of oil collecting therein. The rings are also slotted or perforated to provide passages for the oil from the cylinder wall into the groove. Another type of ring which has been extensively used is one which is circumferentially slotted to impart axial resiliency thereto so as to maintain a seal with the walls of the ring groove. Rings of this latter type are usually reduced in depth to provide greater flexibility for conforming to a non-circular cylinder and to impart the required radial expansion a corrugated ribbon expander is placed between the ring and the bottom of the ring groove.

It is the object of the present invention to obtain a construction of ring particularly adapted for use in the bottom drained oil groove of the piston which also has the advantages resulting from the use of a radially thin ring and a corrugated ribbon expander. Inasmuch, however, as the expander is usually of substantially the same width as the groove, it would form an obstruction to the passage of the oil to the drain and would therefore interfere with the proper functioning of the ring. I have overcome this difficulty by the construction as hereinafter set forth.

As illustrated A is the piston and B, B', B² the ring grooves therein, the lower groove being provided with the drain apertures C passing through the wall of the piston. D is a plain ring in the ring groove B and E is a circumferentially slotted axially resilient ring in the groove B' with a corrugated ribbon expander F for radially expanding the same.

Figure 1:
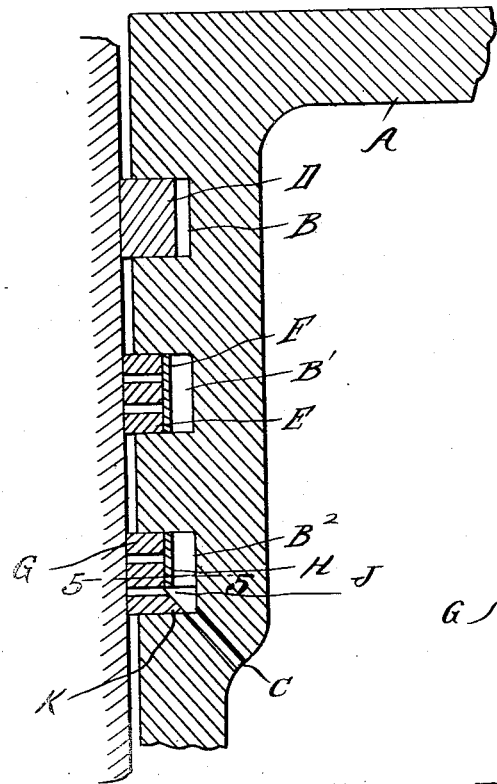
Figure 1 is a section through a portion of a piston shown as having three grooves with my improved construction of ring in the lower groove.
Figure 2:
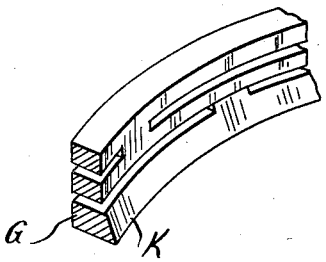
Figure 2 is a sectional perspective view of a portion of the ring.

My improved construction of ring G as shown in Figure 1 is also circumferentially slotted for axial resiliency and is reduced in radial depth for flexibility and to provide clearance for an expander in the ring groove. This expander H is not, however, the full width of the groove but is sufficiently reduced in width to form a passage for the oil to the drain apertures I. Preferably this passage J is beneath the expander and to hold the latter from dropping down and thus barring the passage the ring G is provided with an inwardly extending flange K on its lower portion. The flange K performs the additional function of increasing the bearing or land surface of the ring on the bottom wall of the ring groove and this is important as it is customary with drained ring grooves to relieve the piston on the under side of the groove so as to give greater clearance for the oil. Thus the ring as constructed has the advantages first of sealing with the walls of the ring groove; second, flexibility permitting it to conform to a non-circular cylinder; third, it is moved radially outward by the distributed pressure of the corrugated ribbon expander; fourth, this expander is held up above the bottom of the groove for the passage of oil therebeneath; fifth, the circumferential slots in the ring permit of passage of oil from the cylinder wall inward into the groove from which it drains through the ports C; sixth, the pressure of the expander being directly applied to the upper portion of the ring this portion will squeeze the oil film on the cylinder wall thinner; seventh, the area of peripheral contact is reduced by the slots so that the radial pressure on the ring is more effective in thinning oil film on the cylinder.

Figures 3, 4:
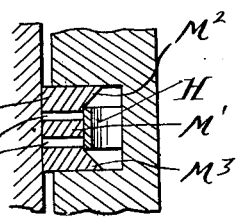
Figures 3 and 4 are cross sections through rings of modified construction.
Figure 5:
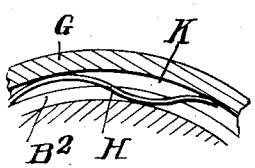
Figure 5 is a horizontal section substantially on the line 5—5 of Figure 1.

While I preferably use the construction shown in Figure 1 certain features of my improvement are also applicable to rings which are not axially expansible. Thus, as shown in Figure 3 a ring L is formed with the radially narrow upper portion L' and the inwardly extending flange L² on its lower portion for holding up the expander H and for increasing the land surface on the ring groove. This ring may be provided with any suitable means such as a single row of slots L³ for permitting oil to pass into the ring groove at various points.

In Figure 4 a ring M is shown having a central radially thin portion M' and flanges M², M³ at the upper and lower ends thereof. Slots M⁴ are provided through the central portion and the expander is held in central position by the flanges M² and M³.

What I claim as my invention is:

1. The combination with a member having a ring groove therein, of a ring in said groove circumferentially slotted for axial resiliency whereby the sides of the ring are held in sealing contact with the sides of the ring groove, said ring having a portion of its width reduced in radial depth to impart circumferential flexibility and provided in its lower portion with an inwardly extending flange increasing the land contact on the ring groove and a corrugated ribbon expander of a width less than the ring groove, said expander being arranged in contact with the thin portion of the ring and held from displacement therein by said flange.

2. The combination with a member having a ring groove therein, and drain apertures for said groove, of a ring of normal width greater than the groove circumferentially slotted for axial resiliency whereby it is held in sealing contact with the walls of the groove, one portion of said ring being reduced in radial depth to increase the flexibility thereof and another portion being provided with an inwardly extending flange and a corrugated ribbon expander within the groove bearing upon the thin portion of the ring and held from displacement by said flange.

3. The combination with a member provided with a ring groove, of a ring in said groove having a portion restricted in radial depth and a plurality of inwardly extending flanges on opposite sides of said portion, and a corrugated ribbon expander within the groove and of a width less than the groove to lie between said inwardly extending flanges.

In testimony whereof I affix my signature.

DEAN M. SOLENBERGER.